US012042854B2

(12) United States Patent
Prete et al.

(10) Patent No.: US 12,042,854 B2
(45) Date of Patent: Jul. 23, 2024

(54) CASTINGS AND MANUFACTURE METHODS

(71) Applicant: Raytheon Technologies Corporation, Farmington, CT (US)

(72) Inventors: Thomas W. Prete, Northford, CT (US); John J. Marcin, Jr., Marlborough, CT (US); Russell A. Beers, Clinton, AR (US)

(73) Assignee: RTX Corporation, Farmington, CT (US)

(*) Notice: Subject to any disclaimer, the term of this patent is extended or adjusted under 35 U.S.C. 154(b) by 80 days.

(21) Appl. No.: 17/542,840

(22) Filed: Dec. 6, 2021

(65) Prior Publication Data

US 2022/0088674 A1 Mar. 24, 2022

Related U.S. Application Data

(60) Continuation of application No. 15/958,321, filed on Apr. 20, 2018, now Pat. No. 11,213,885, which is a division of application No. 14/271,764, filed on May 7, 2014, now Pat. No. 9,975,173.

(60) Provisional application No. 61/830,288, filed on Jun. 3, 2013.

(51) Int. Cl.

| | |
|---|---|
| ***B22D 19/00*** | (2006.01) |
| ***C23C 28/00*** | (2006.01) |
| ***C23C 28/04*** | (2006.01) |
| ***F01D 5/18*** | (2006.01) |

(52) U.S. Cl.

CPC ......... *B22D 19/00* (2013.01); *B22D 19/0072* (2013.01); *C23C 28/044* (2013.01); *C23C 28/048* (2013.01); *C23C 28/321* (2013.01); *C23C 28/347* (2013.01); *C23C 28/36* (2013.01); *F01D 5/187* (2013.01); *F05D 2230/211* (2013.01); *F05D 2300/175* (2013.01); *Y10T 428/1317* (2015.01)

(58) Field of Classification Search

CPC ............ F01D 5/186; F01D 5/187; F01D 5/18

See application file for complete search history.

(56) References Cited

U.S. PATENT DOCUMENTS

| | | | | |
|---|---|---|---|---|
| 3,864,815 | A | 2/1975 | Koch | |
| 6,126,400 | A | 10/2000 | Nichols | |
| 6,165,600 | A | 12/2000 | Ivkovich, Jr. et al. | |
| 6,511,762 | B1 * | 1/2003 | Lee | C23C 28/36 428/218 |
| 6,929,054 | B2 | 8/2005 | Beals et al. | |
| 7,055,574 | B2 | 6/2006 | Strangman et al. | |
| 7,207,373 | B2 | 4/2007 | Parkos, Jr. et al. | |

(Continued)

OTHER PUBLICATIONS

U.S. Office Action dated Jun. 16, 2017 for U.S. Appl. No. 14/271,764.

(Continued)

*Primary Examiner* — Eldon T Brockman

(74) *Attorney, Agent, or Firm* — Bachman & LaPointe, P.C.

(57) ABSTRACT

A method includes casting a metallic material (56) in a mold (20) containing a core, the core having a substrate (40, 44) coated with a coating (42). A removing of the metallic material from the mold and decoring leaves a casting having a layer formed by the coating. The coating has a ceramic having a porosity in a zone (50) near the substrate less than a porosity in a zone (52) away from the substrate.

20 Claims, 3 Drawing Sheets

(56) References Cited

U.S. PATENT DOCUMENTS

| | | | | |
|---|---|---|---|---|
| 7,207,374 | B2 | 4/2007 | Persky et al. | |
| 7,802,613 | B2 | 9/2010 | Bullied et al. | |
| 2003/0021905 | A1 * | 1/2003 | Lee | F01D 5/183 427/402 |
| 2005/0241797 | A1 | 11/2005 | Halberstadt | |
| 2005/0249602 | A1 * | 11/2005 | Freling | B22C 7/02 428/312.2 |
| 2007/0116972 | A1 | 5/2007 | Perksy | |
| 2009/0017260 | A1 | 1/2009 | Kulkarni et al. | |
| 2012/0273153 | A1 | 11/2012 | Ahmad et al. | |
| 2013/0189531 | A1 * | 7/2013 | Lee | C09D 5/18 428/448 |

OTHER PUBLICATIONS

U.S. Office Action dated Oct. 6, 2017 for U.S. Appl. No. 14/271,764.
U.S. Office Action dated Apr. 13, 2020 for U.S. Appl. No. 15/958,321.
U.S. Office Action dated Jul. 21, 2021 for U.S. Appl. No. 15/958,321.

* cited by examiner

CASTINGS AND MANUFACTURE METHODS

CROSS-REFERENCE TO RELATED APPLICATION

This is a continuation of U.S. patent application Ser. No. 15/958,321, filed Apr. 20, 2018, entitled "Castings and Manufacture Methods" which is a divisional of U.S. patent application Ser. No. 14/271,764, filed May 7, 2014, entitled "Castings and Manufacture Methods" and claims the benefit of U.S. Patent Application No. 61/830,288, filed Jun. 3, 2013, and entitled "Castings and Manufacture Methods", the disclosure of which is incorporated by reference herein in its entirety as if set forth at length.

BACKGROUND

The disclosure relates to casting of turbine engine components. More particularly, the disclosure relates to casting of superalloy components with internal cooling passageways.

Gas turbine engine hot section components such as turbine blades, vanes, and air seals are often cast from superalloys (e.g., nickel-based or cobalt based). They are often cast over cores such as molded ceramic cores. Alternative cores include refractory metal cores (RMC) and RMC/ceramic core assemblies).

After casting, a deshelling and decoring process leaves the internal cooling passageways where the cores had been.

It may be desired to apply a thermal barrier coating (TBC) system to the casting.

Coating along the internal passageways poses difficulties.

U.S. Pat. Nos. 6,929,054, 7,207,373, and 7,207,374 disclose alumina protective coatings on RMCs.

U.S. Pat. No. 7,802,613 discloses noble metal plating of ceramic cores (and of ceramic-coated RMCs) to improve wetting by the superalloy during casting.

US Patent Application Publication 2005/0241797A1 discloses transferring an MCrAlY coating from a ceramic core to a superalloy casting.

U.S. Pat. No. 7,055,574 discloses transferring a yttria-stabilized zirconia (YSZ) coating layer and an MCrAlY layer from a sand core to a cast article.

SUMMARY

One aspect of the disclosure involves a method comprising: casting a metallic material in a mold containing a core, the core having a substrate coated with a coating. A removing of the metallic material from the mold and decoring leaves a casting having a layer formed by the coating. The coating comprises a ceramic having a porosity in a zone near the substrate less than a porosity in a zone away from the substrate.

A further embodiment may additionally and/or alternatively include the substrate comprising a molded first ceramic and the coating ceramic comprising a second ceramic different from the first ceramic.

A further embodiment may additionally and/or alternatively include applying the second ceramic to the first ceramic by PVD.

A further embodiment may additionally and/or alternatively include the first ceramic being silica-based and the second ceramic being alumina-based.

A further embodiment may additionally and/or alternatively include the coating ceramic having a characteristic thickness of 1.0 to 10 mil (25 to 250 micrometers).

A further embodiment may additionally and/or alternatively include the coating comprising a first layer applied by a first technique and a second layer applied by a second technique, different from the first technique.

A further embodiment may additionally and/or alternatively include the first technique being a vapor deposition and the second technique not a vapor deposition.

A further embodiment may additionally and/or alternatively include the second layer comprising a first sublayer and a second sublayer of differing porosities.

A further embodiment may additionally and/or alternatively include the second technique being a sol-gel process.

A further embodiment may additionally and/or alternatively include the coating comprising a second metallic material atop and/or intermixed with the ceramic.

A further embodiment may additionally and/or alternatively include at least a majority by weight of the second metallic material diffusing into the metallic material.

A further embodiment may additionally and/or alternatively include the metallic material being a nickel-based superalloy.

A further embodiment may additionally and/or alternatively include the casting having an airfoil.

A further embodiment may additionally and/or alternatively include applying a coating to an exterior of the casting, but not the interior.

Another aspect of the disclosure involves a coated casting comprising a metallic casting having one or more internal passageways and a ceramic lining along the passageways. The ceramic lining has a porosity in a zone near the casting greater than a porosity in a zone away from the casting.

A further embodiment may additionally and/or alternatively include the metallic casting at least partially filling the porosity of at least the zone near the casting.

A further embodiment may additionally and/or alternatively include the metallic casting being nickel-based superalloy.

A further embodiment may additionally and/or alternatively include the coated casting forming a gas turbine engine component.

A further embodiment may additionally and/or alternatively include the coated casting the coated casting, having a thermal barrier coating on an exterior surface of differing composition from said coating.

A further embodiment may additionally and/or alternatively include the casting having an airfoil.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
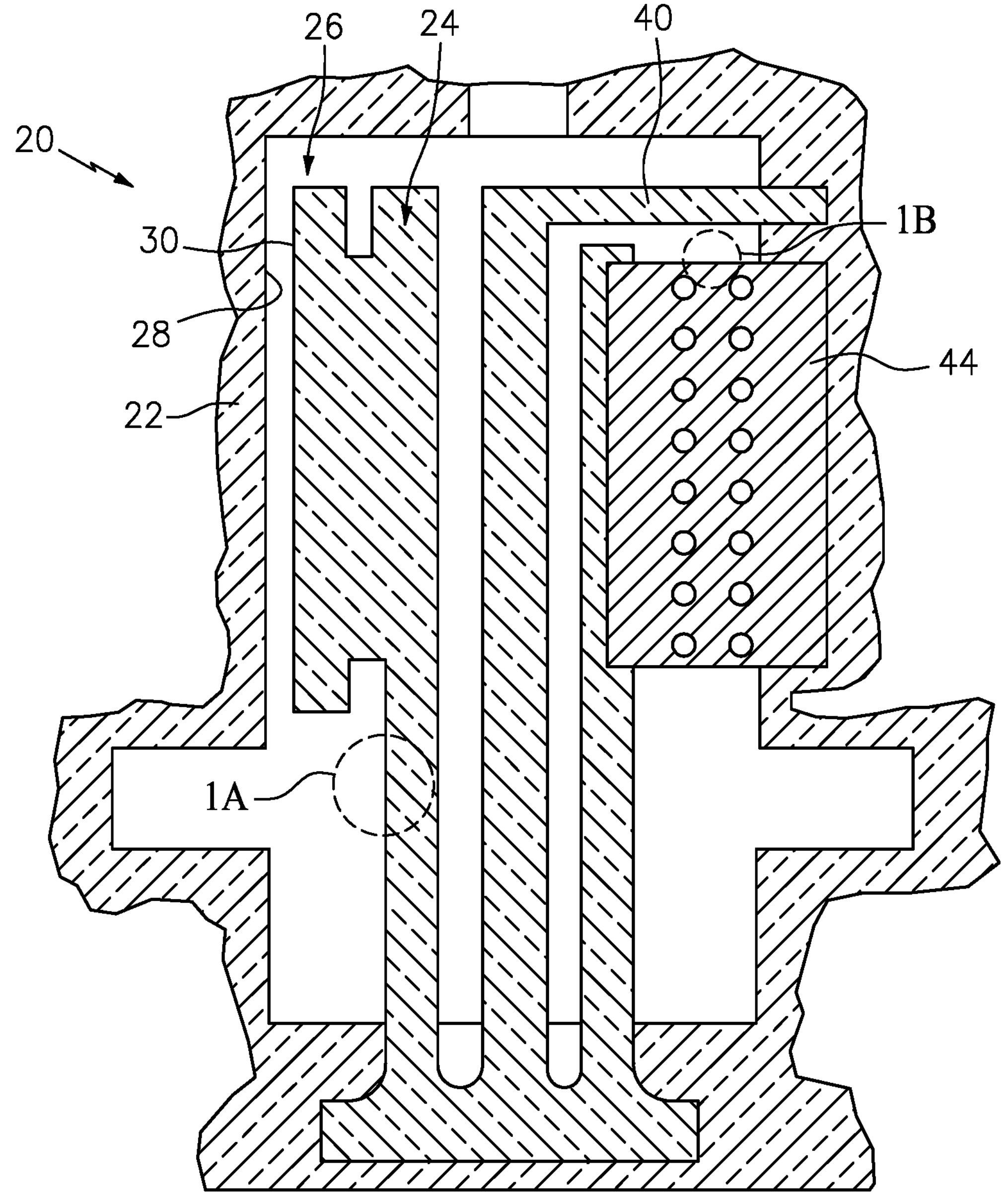
FIG. 1 is a sectional view of a casting mold including a shell and a coated casting core.

FIG. 1 is a sectional view of an investment casting mold 20 comprising a shell 22 and a core 24. The mold has an interior space 26 between a shell inner surface 28 and a core outer surface 30. In casting, the mold interior space receives a molten alloy which solidifies to form a casting (discussed further below). The exemplary mold is for casting a turbine blade for a gas turbine engine. Other exemplary gas turbine engine components include vanes, combustor panels, and outer air seals.

Figure 1A:
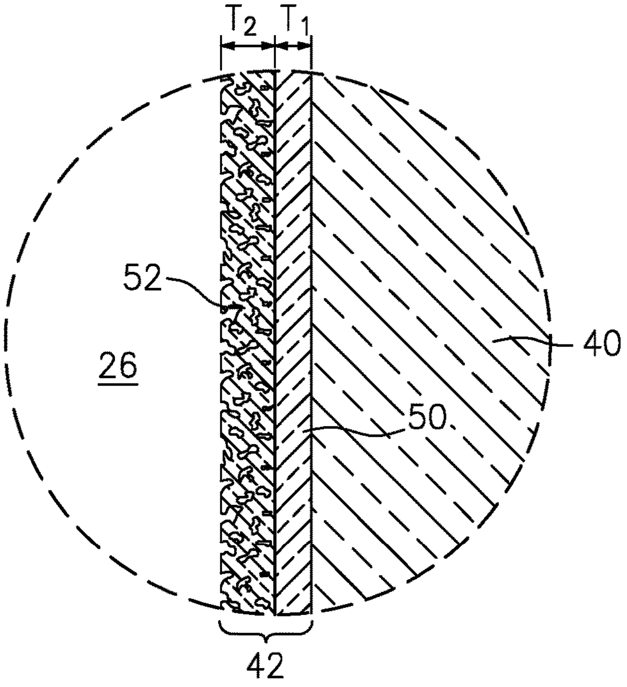
FIG. 1A is an enlarged view of a first portion of the core of the mold of FIG. 1.
Figure 1B:
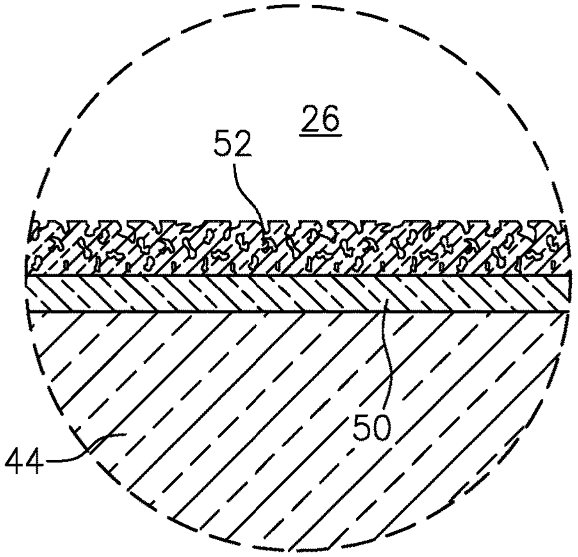
FIG. 1B is an enlarged view of a second portion of the core of the mold of FIG. 1.

The exemplary core 24 comprises a substrate 40 (FIG. 1A) and a multi-layer coating 42. The exemplary substrate is a ceramic substrate. An exemplary ceramic substrate is silica-based (e.g., a molded and fired silica core). Alternative substrates may be possible. One group of alternative substrates 44 is refractory metals (FIG. 1B). Exemplary refractory metals for refractory metal cores (RMC) are Mo and W and such refractory metal(s) may comprise at least 50% by weight of the substrate.

Core assemblies may also be relevant. One example of such assemblies is where one or more RMCs are assembled to one or more ceramic cores. FIG. 1 shows such an assembly. In such a situation, the coating may be applied before or after core assembly and differing coatings (or lack thereof) are possible on different portions of the core or core assembly.

Of the coating 42, at least one of the layers is intended to react with the cast metal and/or survive decoring to become a portion of the ultimate cast article.

A first example of the coating 42 involves an inner layer 50 (FIG. 1A) atop the substrate and an outer layer 52 atop the inner layer. The exemplary layers 50 and 52 are both ceramic but of differing properties. The exemplary layers 50 and 52 are intended to survive decoring and become part of the ultimate article. In a more specific example, the layers 50 and 52 are of differing porosity and/or are applied by different methods.

In a yet more specific example, the layers 50 and 52 both are alumina-based. The inner layer 50 is applied to the substrate via physical vapor deposition (PVD) (e.g., electron beam physical vapor deposition (EB-PVD)), sputtering, and the like. The inner layer 50 has a relatively low porosity and high strength. The layer 52 is applied atop the inner layer 50 such as via a sol-gel process and has a higher porosity than the inner layer 50.

To provide a desired porosity of the layer 52 (and, more particularly, to provide a varied or graded porosity) parameters of the sol-gel process may be controlled/varied. For example, one can vary the rate at which remaining solvents in the sol-gel material are removed to adjust the porosity and final microstructure of the layer, slowing down the rate of solvent removal will allow the sol-gel to form a more dense microstructure.

The exemplary layers 50 and 52 are shown having a respective thicknesses $T_1$ and $T_2$. Exemplary thicknesses $T_1$ and $T_2$ are 0.1 to 5 mil each (2.5 to 130 micrometers) for a combined 5 to 250 micrometers (more particularly 30 to 200 micrometers). In some examples, a relatively low $T_1$ may be desired. For example this may involve a coating along a cooling air passageway as contrasted with a coating exposed to a gaspath. In the cooling air passageway, heat transfer through the coating is desirable (whereas it may be undesirable along the gaspath). In the cooling passageway, physical protection needs may be lower than along the gaspath (e.g., subject to less erosion). Thus the thickness $T_1$ in a cooling passageway may be low to provide a minimal protection (e.g. against oxidation). In such a situation, $T_2$ may need to be high enough to provide good attachment to the casting. Thus, exemplary $T_1<T_2$. For example, exemplary $T_1$ is 5% to 75% of $T_2$. More narrowly, $T_1$ is 10% to 50% of $T_2$. More broadly, exemplary $T_1$ is 5% to 300% of $T_2$.

Thus, an exemplary combination involves $T_1$ of 0.2 mil to 2.0 mils (5 micrometers to 50 micrometers, more narrowly 10 micrometer to 40 micrometer, more broadly 3 micrometer to 100 micrometer) and $T_2$ of 1.0 mil to 3.0 mil (25 micrometers to 80 micrometers, more narrowly 40 micrometer to 75 micrometer, more broadly 15 micrometer to 150 micrometer).

In yet more specific examples (not shown), the layer 52 has a graded porosity starting from relatively low porosity near the layer 50 and proceeding to relatively high porosity near its outer surface. An exemplary porosity variation involves: (1) essentially full density of the layer 50 (e.g., at least 95% dense, more broadly at least 90%): (2) substantially full density of the layer 52 near the layer 50 (e.g., over at least 10% local or average depth of the layer 52 (more narrowly, at least 20%)) a density of at least 95% dense, more broadly at least 90%); and (3) near the surface of the layer 52 (e.g., over at least 10% local or average depth of the layer 52 (more narrowly, at least 20%)) lower density (e.g., 15% or more porosity, more particularly, 20% or more with an exemplary 20-30%).

Figure 2:
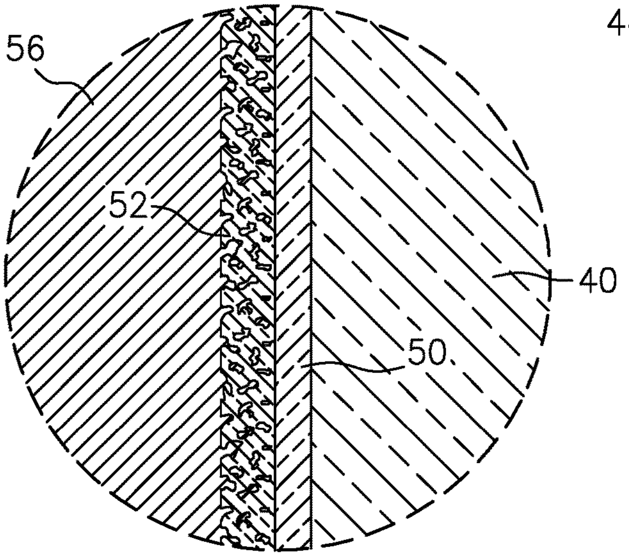
FIG. 2 is an enlarged view of the first portion of the mold of FIG. 1 after casting.

During casting, the high porosity of the layer 52 (or the region near its outer surface) allows infiltration of casting metal 56 (FIG. 2) to provide strong mechanical interlocking to resist delamination.

Figure 3A:
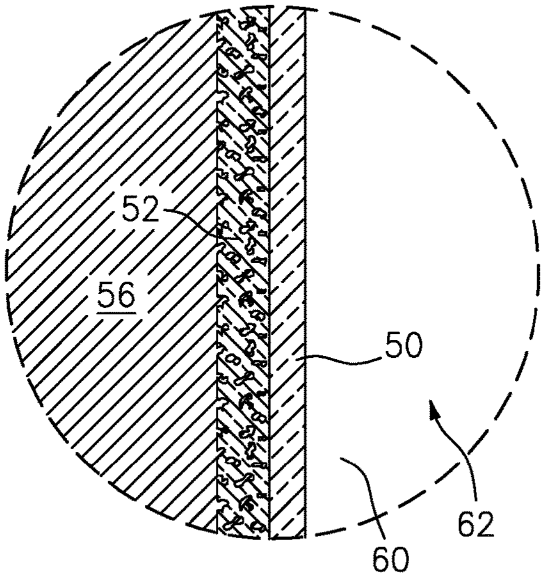
FIG. 3A is an enlarged view of the first portion of the casting of FIG. 3.

After the cast metal has cooled, an exemplary deshelling and decoring process involves mechanically deshelling (e.g., breaking the shell) followed by chemically decoring. Exemplary decoring involves chemical leaching, such as alkaline leaching (e.g., with an aqueous solution comprising NaOH and/or KOH (exemplary concentration 25-50% molar)) and is effective to remove most if not all of the substrate while leaving most if not all of the inner layer 50. If a refractory metal core is used, an acid leach may be used (thus a series alkaline and acid leaching may remove a core assembly). An exemplary acid leach involves a mixture of nitric, hydroflouric and hydrochloric acids. The inner layer 50 thus provides a surface 60 (FIG. 3A) of an internal passageway 62 in the casting and may provide thermal and/or chemical protection to the cast metal along the passageway.

Figure 3:
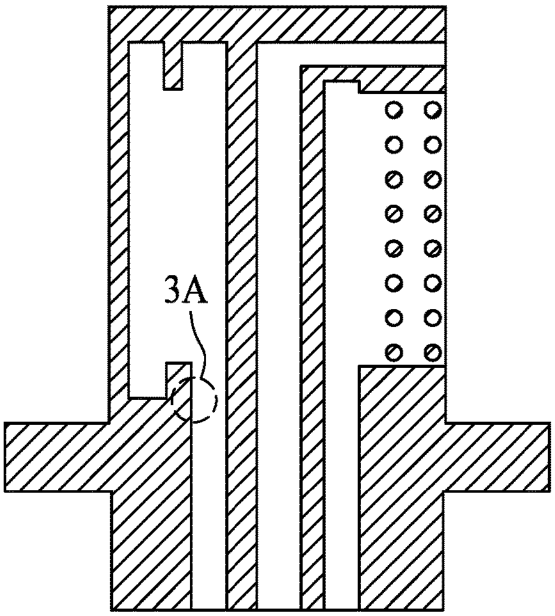
FIG. 3 is a sectional view of a blade formed by the casting after deshelling/decoring and exterior coating.

FIG. 3 shows a casting (e.g., of a blade having an airfoil extending from an inboard end at a platform to a tip and an attachment root (e.g., firtree) extending from an underside of the platform) which may have an exterior surface to which a conventional thermal barrier coating (TBC) system is applied (e.g., by spray and or PVD of a metallic bondcoat (e.g., MCrAlY or aluminide) and a ceramic thermal barrier coating (e.g., YSZ, GSZ, and the like).

Some material variations involve using an oxynitride as a ceramic coating layer in place of alumina for one or both of the layers 50 and 52. For example, silicon oxynitride ($Si_2N_2O$) has good thermal stability up to 1600° C. and would be expected to have chemical compatibility with the standard silica core materials. Additionally, these materials are commonly doped with aluminum to form SiAlON compounds with exceptional chemical inertness and corrosion resistance. These compounds can be created by reactive PVD techniques such as cathodic arc and magnetron sputtering to form useful thin films.

Figure 4:
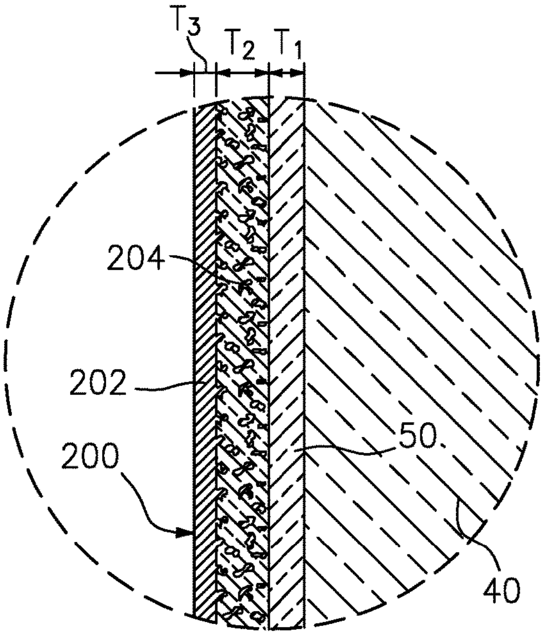
FIG. 4 is an enlarged view of a first portion of the core of the mold of FIG. 1 with an alternate coating.

Some variations on the dual ceramic layer or graded ceramic layer involve metal as a separate layer atop the ceramic and/or intermixed with the ceramic. The metal may improve wetting of the ceramic by the casting alloy and may fully or partially diffuse into the casting alloy (e.g., at least a majority of the metal 200 diffusing into the alloy, more particularly, at least 90% or at least 95%). FIG. 4 shows metal 200 forming a body having a surface layer/portion 202 atop the ceramic 52 and a portion 204 intermixed to fill pores in the ceramic 52. The layer 202 has a thickness shown as $T_3$. Exemplary $T_3$ is less than the combined ceramic layer thickness ($T_1+T_2$), more particularly less than each of the ceramic layers. Thus exemplary $T_3$ is up to 1 mil (25 micrometer), more particularly up to 10 micrometer (e.g. 0.05 micrometer to 0.5 micrometer).

One example of such use of metal involves molybdenum. Exemplary molybdenum is commercially pure molybdenum. A broader range includes alloys or mixtures of at least 50% molybdenum or at least 90% by weight. Alternative metals may be used. Exemplary metals include Mo, W, Ta, Pt, Pd, and their mixtures and alloys, optionally with other components of less than plurality weight. Exemplary application techniques are deposition techniques (e.g., vapor or spray). Exemplary vapor deposition is chemical vapor deposition (CVD). Alternative techniques include plating (e.g., electroless).

Figure 5:
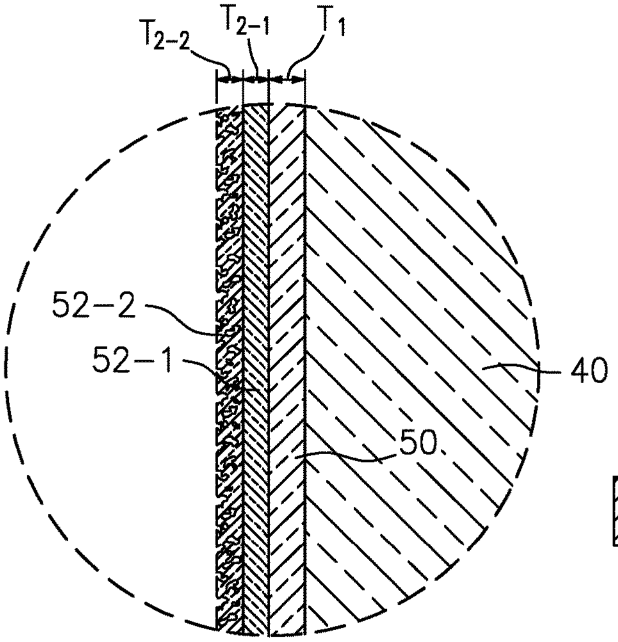
FIG. 5 is an enlarged view of a first portion of the core of the mold of FIG. 1 with an alternate coating.

FIG. 5 shows a further alternative variation wherein the layer 52 is further divided into sublayers 52-1 and 52-2, having respective thicknesses $T_{2-1}$ and $T_{2-2}$. Both these sublayers may be broadly deposited via similar technique (e.g., sol-gel) while this may differ from the technique used to apply the layer 50. The sublayer 52-1 is relatively less porous than the layer 52-2. This may essentially confine metal infiltration to the sublayer 52-2. Each sublayer may represent at least 15% of the thickness 12 above, more particularly, at least 30%. In such an example, the layer 52-2 may serve to allow mechanical bonding between the cast alloy and the under-lying layer 52-2.

The exemplary mold is an investment casting mold including a shell. An exemplary shell is formed by placing the core(s) in a die to overmold the core with a sacrificial pattern-forming material (e.g., wax) to form a pattern from which portions of the core(s) protrude. The pattern is then shelled with a ceramic stucco so that the exposed core portions become embedded in the shell. In one or more steps, the shell is hardened and the wax removed to leave the interior space 26.

Alternative molds include non-shell sacrificial mold members instead of the shell. Yet further alternative molds include reusable dies used in die casting.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A coated casting comprising:

a metallic casting having an airfoil and one or more internal passageways extending through the airfoil; and a ceramic lining along the passageways, wherein:

the ceramic lining has a porosity in a zone near the casting greater than a porosity in a zone away from the casting.

2. The coated casting of claim 1 wherein:

the metallic casting at least partially fills the porosity of at least the zone near the casting.

3. The coated casting of claim 2 wherein:

the zone near the casting comprises a first portion near the casting and a second portion between the first portion and the zone away from the casting, the second portion being less porous than the first portion.

4. The coated casting of claim 1 wherein:

the metallic casting is a nickel-based superalloy.

5. The coated casting of claim 1 wherein:

the coated casting forms a gas turbine engine component.

6. The coated casting of claim 1 wherein:

the coated casting has a thermal barrier coating on an exterior surface of differing composition from said coating.

7. The coated casting of claim 1 wherein:

the casting forms a blade having an attachment root.

8. The coated casting of claim 1 wherein:

the zone away from the casting is silica-based; and the zone near the casting is alumina-based.

9. The coated casting of claim 8 wherein:

the ceramic lining has a thickness of 1.0 to 10 mil.

10. The coated casting of claim 1 wherein:

the ceramic lining has a thickness of 1.0 to 10 mil.

11. A method for manufacturing the coated casting of claim 1, the method comprising:

casting a metallic material in a mold containing a core, the core having a substrate coated with a coating; and removing the metallic material from the mold and decoring to leave the metallic casting formed by the metallic material and the ceramic lining formed by the ceramic coating.

12. The method of claim 11 wherein:

the substrate comprises a molded first ceramic and the coating ceramic comprises a second ceramic different from the first ceramic.

13. The method of claim 12 further comprising:

applying the second ceramic to the first ceramic by PVD.

14. The method of claim 11 wherein:

the coating comprises a first layer applied by a first technique and a second layer applied by a second technique, different from the first technique.

15. The method of claim 14 wherein:

the first technique is a vapor deposition and the second technique is a sol-gel process.

16. The method of claim 15 wherein:

the second layer comprises a first sublayer and a second sublayer of differing porosities.

17. The method of claim 11 wherein:

the coating further comprises a second metallic material atop and/or intermixed with the ceramic.

18. The method of claim 17 wherein:

at least a majority by weight of the second metallic material diffuses into the metallic material.

19. The method of claim 11 further comprising:
applying a coating to an exterior of the casting, but not the interior.

20. The method of claim 11 further comprising:
applying a metallic bondcoat to an exterior of the casting by spray and/or PVD; and
applying a ceramic thermal barrier coating to an exterior of the casting by spray and/or PVD.

* * * * *